(12) United States Patent
Zhuang et al.

(10) Patent No.: US 10,095,331 B2
(45) Date of Patent: Oct. 9, 2018

(54) ARRAY SUBSTRATE, TOUCH DISPLAY PANEL AND DRIVING METHOD FOR ARRAY SUBSTRATE

(71) Applicants: Xiamen Tianma Micro-Electronics Co., Ltd., Xiamen (CN); Tianma Micro-Electronics Co., Ltd., Shenzhen (CN)

(72) Inventors: Zhilong Zhuang, Xiamen (CN); Jiancai Huang, Xiamen (CN); Yumin Xu, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 97 days.

(21) Appl. No.: 15/097,292

(22) Filed: Apr. 13, 2016

(65) Prior Publication Data

US 2016/0328037 A1    Nov. 10, 2016

(30) Foreign Application Priority Data

May 8, 2015  (CN) .......................... 2015 1 0232986

(51) Int. Cl.
*G06F 3/041* (2006.01)
*G06F 3/044* (2006.01)
*G09G 3/00* (2006.01)

(52) U.S. Cl.
CPC .............. *G06F 3/041* (2013.01); *G06F 3/044* (2013.01); *G06F 3/0412* (2013.01); *G06F 3/0416* (2013.01); *G09G 3/00* (2013.01)

(58) Field of Classification Search
CPC ............................. G06F 3/041; G06F 3/0412
See application file for complete search history.

(56) References Cited

U.S. PATENT DOCUMENTS

2012/0044166 A1* 2/2012 Mizuhashi ............ G06F 3/0412
345/173
2012/0044167 A1* 2/2012 Nakanishi ............ G06F 3/0412
345/173

FOREIGN PATENT DOCUMENTS

TW            201504905 A        2/2015

* cited by examiner

*Primary Examiner* — Chun-Nan Lin
(74) *Attorney, Agent, or Firm* — Kilpatrick Townsend & Stockton LLP

(57) ABSTRACT

The disclosure provides an array substrate, a touch display panel and a driving method that employ the array substrate. A driver circuit can be disposed in a non-display region of the array substrate, and can include a first and a second shift registers. The first shift register can include a first display scan signal outputting terminal outputting a first display scan signal, and the second shift register can include a second display scan signal outputting terminal outputting a second display scan signal. The array substrate can include a touch scanning circuit having a first control terminal connected to the first display scan signal outputting terminal, and a second control terminal connected to the second display scan signal outputting terminal. During a touch period, the touch scanning circuit outputs a touch signal through the touch signal outputting terminal according to the first and second display scan signals.

14 Claims, 14 Drawing Sheets

ARRAY SUBSTRATE, TOUCH DISPLAY PANEL AND DRIVING METHOD FOR ARRAY SUBSTRATE

CROSS-REFERENCES TO RELATED APPLICATIONS

This application claims priority to a Chinese patent application No. 201510232986.X filed on May 8, 2015 and entitled "Array Substrate, Touch Display Panel And Driving Method For Array Substrate", the disclosure of which is incorporated herein by reference in its entirety.

TECHNICAL FIELD

The present application relates to the field of displaying technologies, in particular to an array substrate, a touch display panel and a driving method for an array substrate.

BACKGROUND

In the field of displaying technologies, a display function and a touch function are integrated into a display panel for more and more products, so that the thickness of the display panel is reduced significantly. In particular, an in-cell touch display panel is most effective in reducing the thickness.

In the in-cell touch display panel, touch electrodes are integrated into an array substrate, and driven by a touch driving circuit disposed in a non-display region on the array substrate. However, the non-display region on the array substrate is typically further provided with a scan driving circuit, which mainly includes shift registers corresponding respectively to various rows of pixel units in a display region. In a frame scanning process, each row of pixel units are turned on by a display scan signal outputted from the shift register.

Because both the scan driving circuit and the touch driving circuit occupy layout areas in the non-display region, integrating the touch electrodes into the array substrate will inevitably increase the width of the non-display region, so that the frame region of the display panel is increased, leading to a difficulty in frame narrowing.

SUMMARY

In view of the above, embodiments of the present disclosure provide an array substrate, a touch display panel and a driving method for the array substrate.

An aspect of embodiments of the present disclosure provides an array substrate, which includes a display region, a non-display region surrounding the display region, pixel units arranged as an array in the display region, and a driver circuit disposed in the non-display region, and the driver circuit includes:

a first shift register and a second shift register, where the first shift register includes a first display scan signal outputting terminal for outputting a first display scan signal, and the second shift register includes a second display scan signal outputting terminal for outputting a second display scan signal; and a touch scanning circuit having a first control terminal and a second control terminal, the first control terminal being connected to the first display scan signal outputting terminal, the second control terminal being connected to the second display scan signal outputting terminal, wherein the touch scanning circuit further comprises a touch signal inputting terminal and a touch signal outputting terminal such that in a touch period, the touch scanning circuit is configured to output a touch signal through the touch signal outputting terminal according to the first display scan signal and the second display scan signal.

Another aspect of embodiments of the present disclosure provides a touch display touch, which includes a color filter substrate, the above array substrate and a driver chip connected to the driver circuit of the array substrate.

Yet another aspect of embodiments of the present disclosure provides a driving method for an array substrate, where the array substrate includes: a display region, a non-display region surrounding the display region, pixel units arranged as an array in the display region, and a driver circuit disposed in the non-display region, and the driver circuit includes a first shift register, a second shift register and a touch scanning circuit, and the driving method includes:

outputting a first display scan signal from a first display scan signal outputting terminal of the first shift register, and outputting a second display scan signal from a second display scan signal outputting terminal of the second shift register; and outputting a touch signal from a touch signal outputting terminal of the touch scanning circuit, according to the first display scan signal outputted by the first shift register and the second display scan signal outputted by the second shift register.

With the technical solutions provided by the embodiments of the present disclosure, the touch scanning circuit is provided to cooperate with the first and second shift registers configured for outputting display scan signals for displaying, and the touch scanning circuit can be used to perform a touch scanning operation in the interval between the first display scan signal outputted by the first shift register and the second display scan signal outputted by the second shift register. The first shift register and the second shift register are configured to provide the display scan signals to the corresponding pixel units for displaying during the display period, and provide a trigger signal and a termination signal for a touch scanning operation during the touch period. In the technical solutions provided by the embodiments of the present disclosure, the first shift register and the second shift register are reused in the display period and the touch period, so that there is no longer a need to additionally provide a certain shift register for the touch period. In this case, the number of the circuit elements required for the non-display region of the array substrate is effectively reduced, so that the layout area required for the driver circuit in the non-display region is decreased, thereby reducing the width of the non-display region, satisfying the requirement for frame narrowing. Besides, the number of the scan lines required for achievement of the touch function by the driving chip can be reduced, and the number of I/O ports in the driving chip can also be reduced.

DESCRIPTION OF DRAWINGS

Other features, objects and advantages of the present disclosure will become apparent from the following detailed description made to nonrestrictive embodiments with reference to the accompanying drawings, in which.

DETAILED DESCRIPTION OF THE EMBODIMENTS

Technical solutions of the present disclosure will be further illustrated through specific embodiments below in conjunction with the accompanying drawings. It may be understood that specific embodiments described herein are merely for explaining the present disclosure rather than limiting the present disclosure. In addition, it should be illustrated that merely partial content associated with the present disclosure rather than all contents is illustrated in the accompanying drawings for ease of description.

In the related art, as described above, integrating the touch function into the array substrate requires that the driver circuit for touch scanning operations needs to be provided on the array substrate, so that the width of the non-display region is increased, frame narrowing for the display panel is hard to be achieved, and a large number of scan lines and I/O ports need to be additionally provided for the touch function on a driver chip. In order to avoid this, the present disclosure provides a technical solution in which shift registers used for displaying are reused to provide a trigger signal and a termination signal for a touch scanning operation. According to the technical solution of the embodiment of the present disclosure, the touch scanning operation is performed within an interval between a display scanning operation conducted by the shift registers for a row of pixel units and a successive display scanning operation conducted by the shift registers for another row of pixel units.

Figure 1:
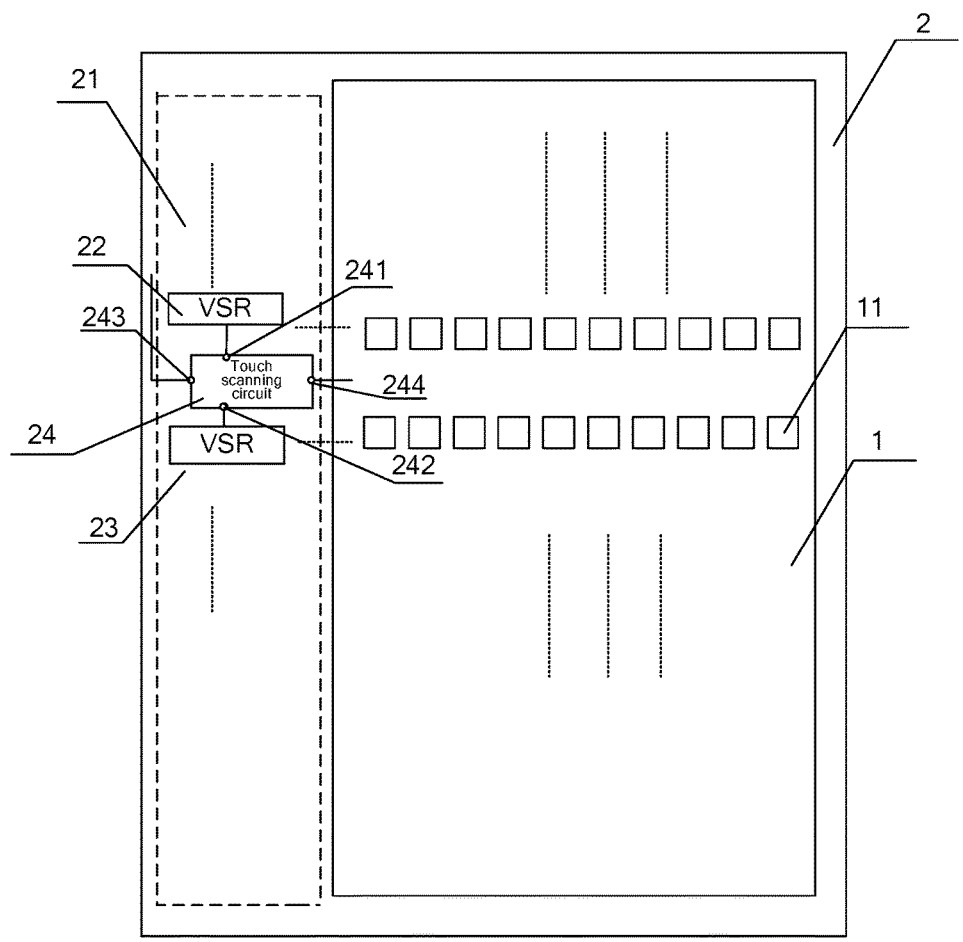
FIG. 1 is a schematic top view showing a first array substrate provided in an embodiment of the present disclosure.

FIG. 1 is a schematic top view showing a first array substrate provided in an embodiment of the present disclosure. As shown in FIG. 1, the array substrate includes a display region 1 and a non-display region 2 surrounding the display region 1. Pixel units 11 arranged as an array are disposed in the display region 1, and a driver circuit 21 is disposed in the non-display region. The driver circuit 21 includes a first shift register (VSR) 22, a second shift register (VSR) 23 and a touch scanning circuit 24. The first shift register 22 includes a first display scan signal outputting terminal for outputting a first display scan signal, and the second shift register 23 includes a second display scan signal outputting terminal for outputting a second display scan signal. A first control terminal 241 of the touch scanning circuit 24 is connected to the first display scan signal outputting terminal, and a second control terminal 242 of the touch scanning circuit is connected to the second display scan signal outputting terminal. The touch scanning circuit 24 further includes a touch signal inputting terminal 243 and a touch signal outputting terminal 244, where in a touch period, the touch scanning circuit 24 controls, according to the first display scan signal and the second display scan signal, the touch signal outputting terminal 244 to output a touch signal.

With the technical solution provided by the embodiment of the present disclosure, the display scan signals outputted by the two shift registers are respectively utilized as a trigger signal and a termination signal to be used in outputting a touch signal by the touch scanning circuit, thereby reusing the shift registers already existing in the driver circuit during a touch period and a display period. The touch scanning can thus be implemented within the interval between display scanning operations. Further, the display duration and the touch duration are explicitly separated, so that there is no interference in time sequence between the display scanning operation and the touch scanning operation. With such a technical solution, there is no longer a need to additionally provide a certain shift register for the touch period. In this case, the number of the circuit elements required for the non-display region of the array substrate is effectively reduced, so that the layout area required for the driver circuit in the non-display region is decreased, thereby reducing the width of the non-display region, satisfying the requirement for frame narrowing. Besides, the number of the scan lines required for achievement of the touch function by the driving chip can be reduced, and the number of I/O ports in the driving chip can also be reduced.

The driver circuit on the array substrate is typically designed in two design schemes, i.e. a first design scheme and a second design scheme. Under the first design scheme, the various shift registers are disposed in the non-display region on one side of the array substrate (i.e. one side of the display region). Under the second design scheme, the various shift registers are disposed in the non-display region on two sides of the array substrate: for example, shift registers configured for driving even-numbered rows of pixel units are disposed in the non-display region on a first side of the array substrate and shift registers configured for driving odd-numbered rows of pixel units are provided in the non-display region on a second side of the array substrate.

Figure 2A:
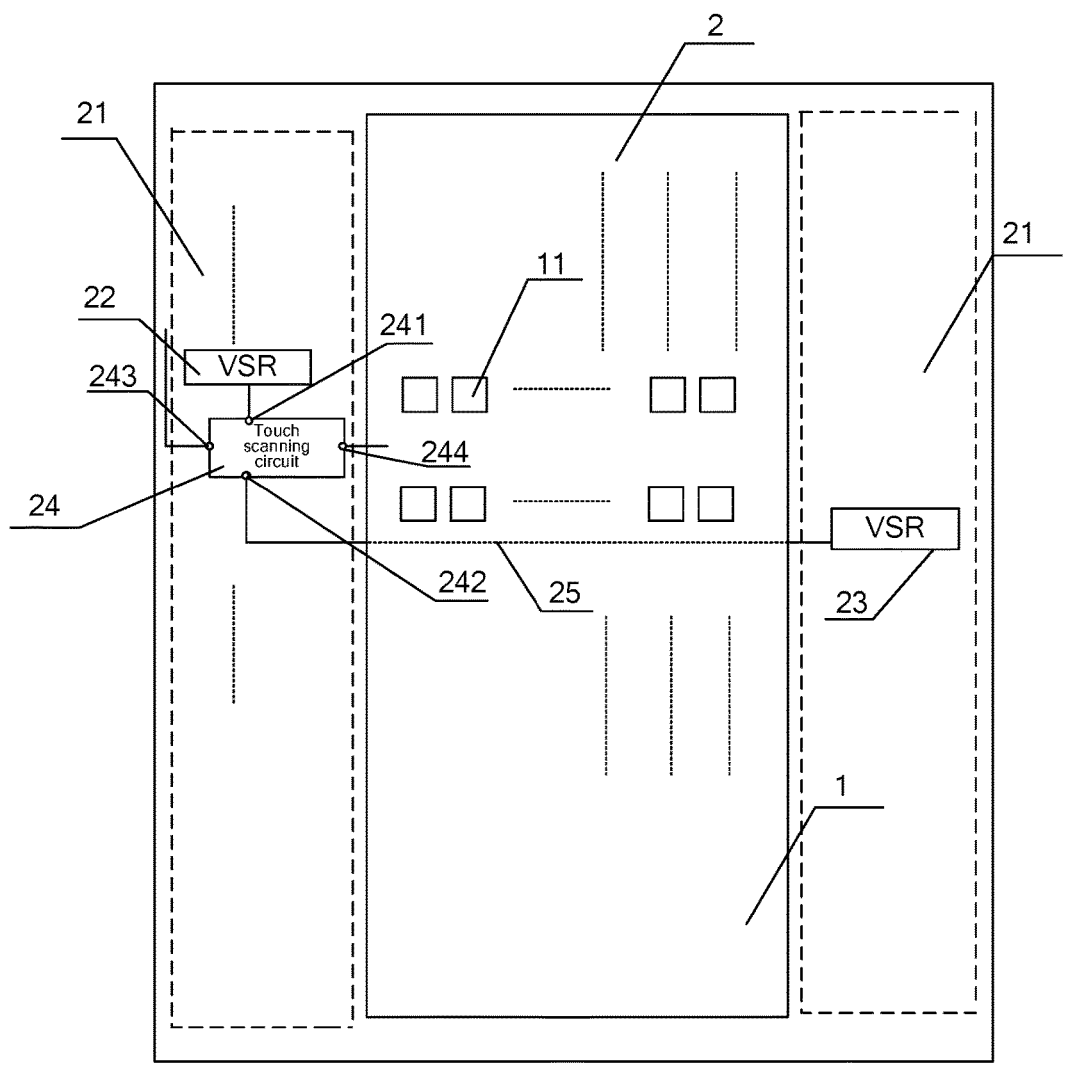
FIG. 2A is a schematic top view showing a second array substrate provided in an embodiment of the present disclosure.
Figure 2B:
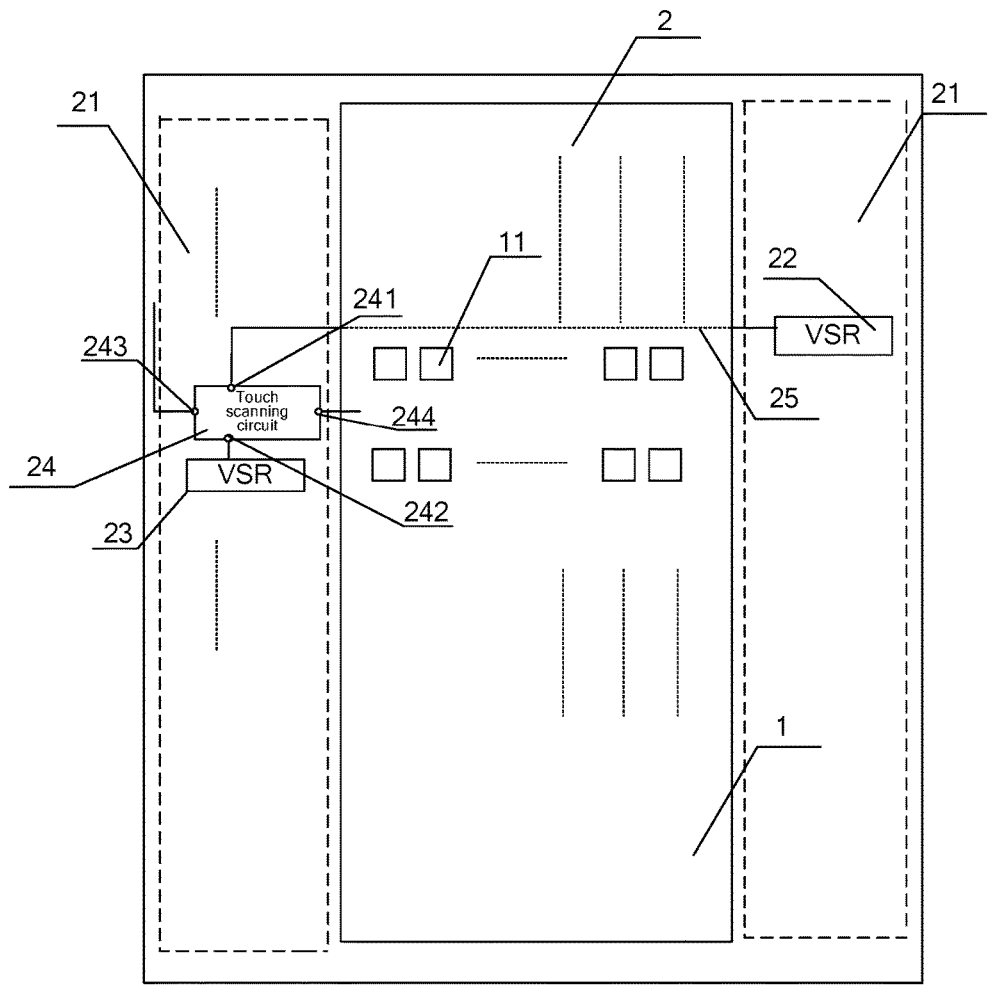
FIG. 2B is a schematic top view showing a third array substrate provided in an embodiment of the present disclosure.

According to the first design scheme, referring to FIG. 1, the first shift register 22, the second shift register 23 and the touch scanning circuit 24 are all disposed in the non-display region on a first side of the array substrate. According to the second design scheme, referring to FIG. 2A, the first shift register 22 and the touch scanning circuit 24 of the driver circuit 21 are disposed in the non-display region on the first side of the array substrate, while the second shift register 23 is disposed in the non-display region on the second side of the array substrate. Alternatively, still according to the second design scheme, referring to FIG. 2B, the first shift register 22 is disposed in the non-display region on the second side of the array substrate, while the second shift register 23 and the touch scanning circuit 24 are disposed in the non-display region on the first side of the array substrate. Furthermore, in the case that the touch scanning circuit 24 and the second shift register 23 are not located in the non-display region at the same side of the array substrate, as shown in FIG. 2A, the second control terminal 242 of the touch scanning circuit 24 is connected to the second display scan signal outputting terminal of the second shift register 23 located in the non-display region on the second side of the array substrate through a first wire 25 running through the display region 1 of the array substrate, as shown in FIG. 2. Or, in the case that the touch scanning circuit 24 and the first shift register 22 are not located in the non-display region on the same side of the array substrate, the first control terminal 241 of the touch scanning circuit 24 is connected to the first display scan signal outputting terminal of the first shift register 22 located in the non-display region on the second side of the array substrate through a second wire 26 running through the display region 1 of the array substrate.

As shown in FIGS. 1, 2A and 2B, the relative position relationships between the touch scanning circuit 24 and the first and second shift registers 22, 23 are given as above.

Figure 3A:
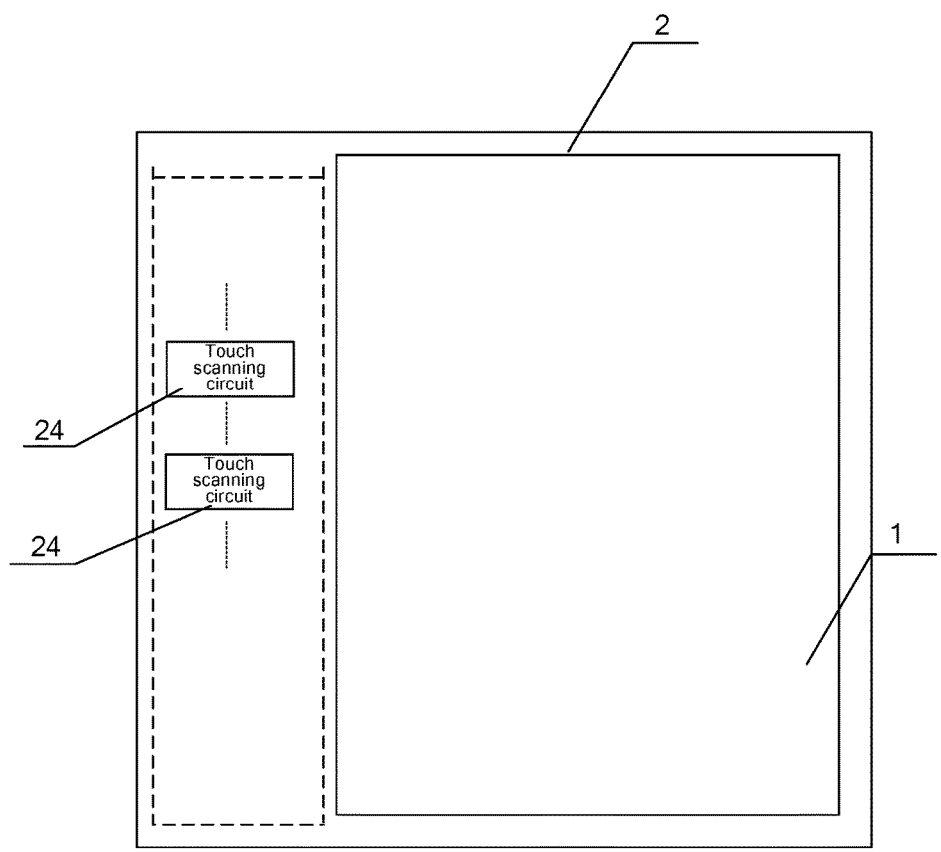
FIG. 3A is a schematic top view showing a fourth array substrate provided in an embodiment of the present disclosure.
Figure 3B:
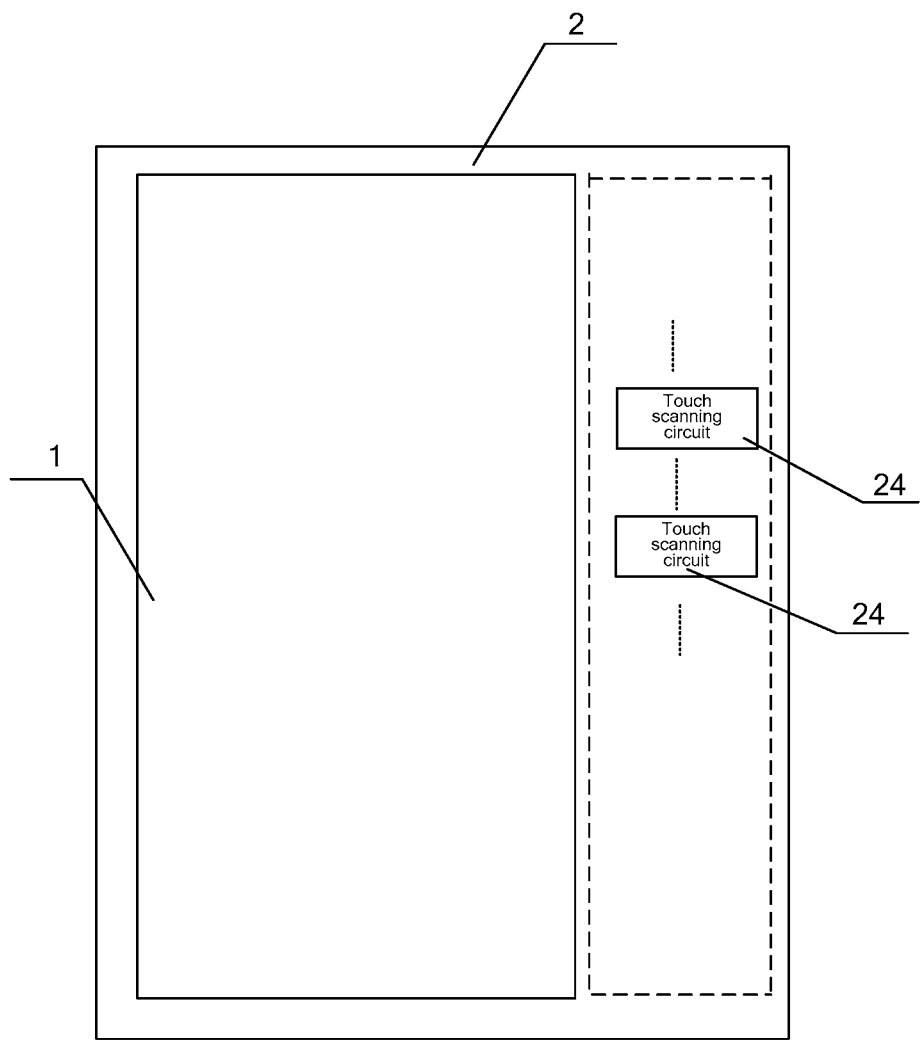
FIG. 3B is a schematic top view showing a fifth array substrate provided in an embodiment of the present disclosure.
Figure 3C:
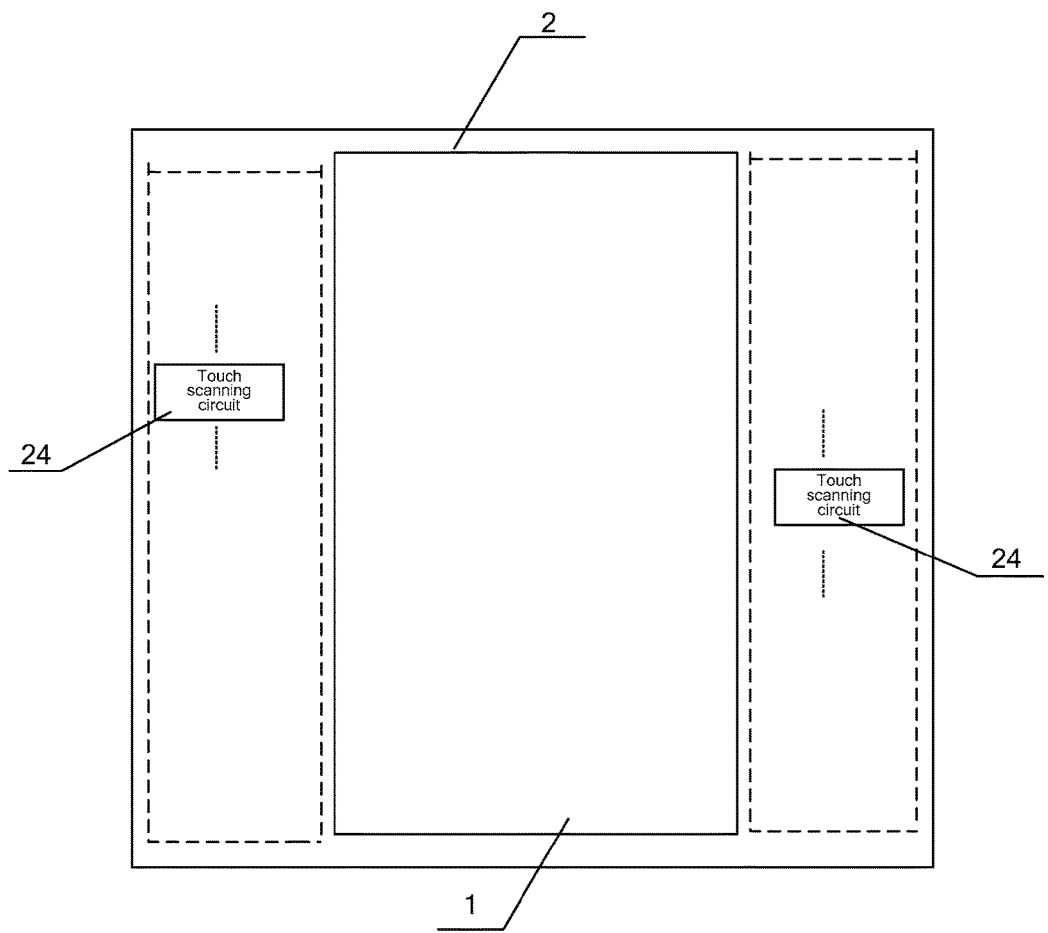
FIG. 3C is a schematic top view showing a sixth array substrate provided in an embodiment of the present disclosure.

In the case that the driver circuit includes at least two touch scanning circuits 24 described above, the at least two touch scanning circuits 24 can be disposed in the non-display region on the first side and/or the second side of the array substrate, as respectively shown in FIGS. 3A, 3B, and 3C. FIG. 3A shows that at least two touch scanning circuits 24 can be disposed in the non-display region at the first side of the array substrate. FIG. 3B shows that the at least two touch scanning circuits 24 can be disposed in the non-display region at the second side of the array substrate. FIG. 3C shows that the at least two touch scanning circuits 24 can be disposed in the non-display region at the first and second sides of the array substrate.

The specific arrangement of the shift registers and the touch scanning circuit of the driver circuit in the non-display region as well as the arrangement of the touch electrodes and pixel electrodes in the display region of the array substrate provided in the embodiment of the present disclosure are illustrated below.

Figure 4:
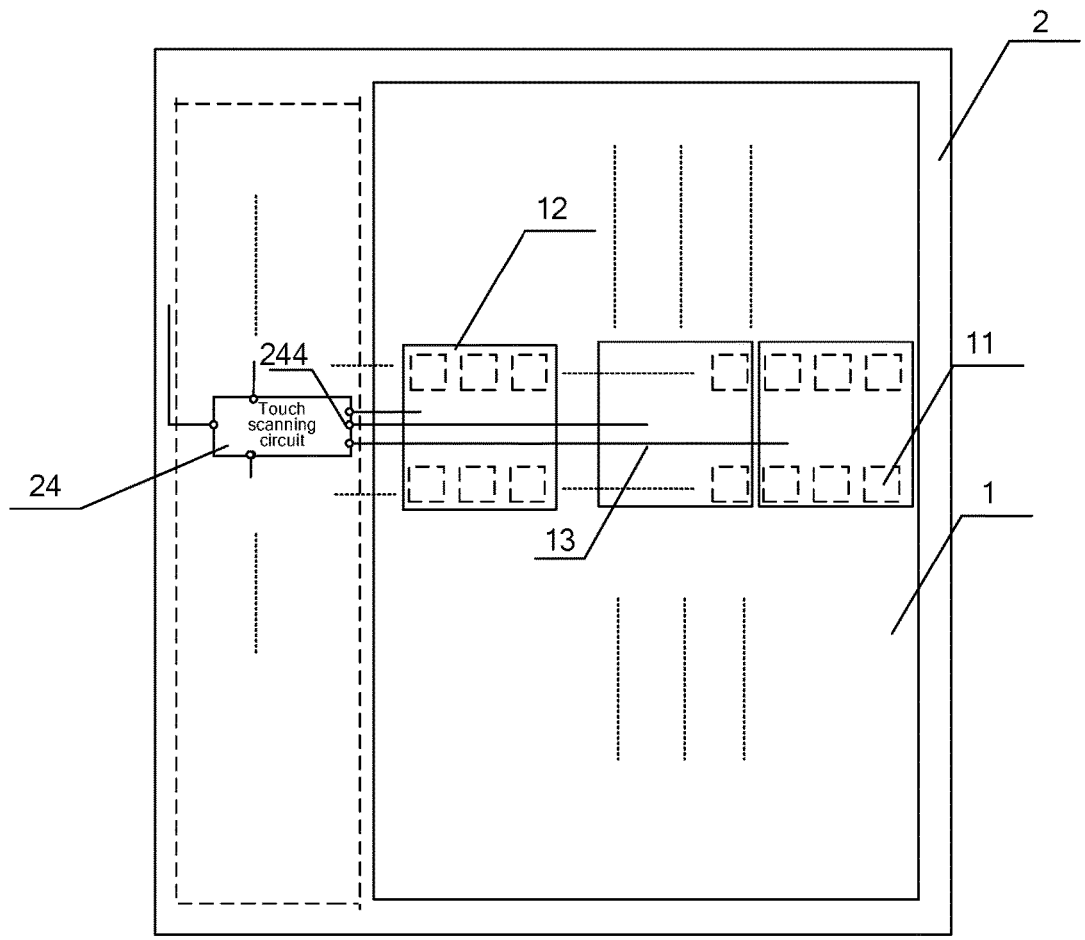
FIG. 4 is a schematic diagram showing an arrangement of touch electrodes on an array substrate according to an embodiment of the present disclosure.

Specifically, reference is made below to FIG. 4 schematically showing an arrangement of touch electrodes on an array substrate according to an embodiment of the present disclosure. To achieve the touch function, touch electrodes 12 are required to be disposed in the display region 1 of the array substrate. The touch electrodes 12 may be embodied as a dedicated layer on the array substrate, or may be obtained by multiplexing a common electrode on the array substrate as the touch electrodes 12. That is, the common electrode in the display region 1 of the array substrate is divided into the touch electrodes 12 arranged in a matrix, each of the touch electrodes 12 is assigned with a corresponding touch wire 13, and each row of the touch electrodes 12 are connected to the touch signal outputting terminal 244 of the same touch scanning circuit 24 via the corresponding touch wire 13.

The technical solution of the embodiment of the present disclosure can be employed in an In-Plane Switching (IPS) technique or a Fringe Field Switching (FFS) technique. In the IPS technique, the touch electrodes divided from the common electrode and the pixel electrodes are located in the same layer, while in the FFS technique, the touch electrodes divided from the common electrode and the pixel electrodes are located in different layers, and in this case, the touch electrodes may be located in a layer above or below the pixel electrodes.

Still referring to FIG. 4, pixel units 11 are disposed on the array substrate. As for the touch electrodes 12 and the pixel units 11 on the array substrate, each row of touch electrodes 12 corresponds to at least two rows of the pixel units 11. Specifically, in the case that the touch electrodes and the pixel electrodes are located in the same layer, each row of the touch electrodes are distributed in the same region of the array substrate as pixel electrodes of the at least two rows of pixel units corresponding to the row of the touch electrodes, and are arranged alternately with the pixel electrodes. In the case that the touch electrodes and the pixel electrodes are located in different layers, each row of touch electrodes substantially overlap the pixel electrodes of the at least two rows of pixel units corresponding to the touch electrodes in a light penetrating direction of the array substrate.

Figure 5A:
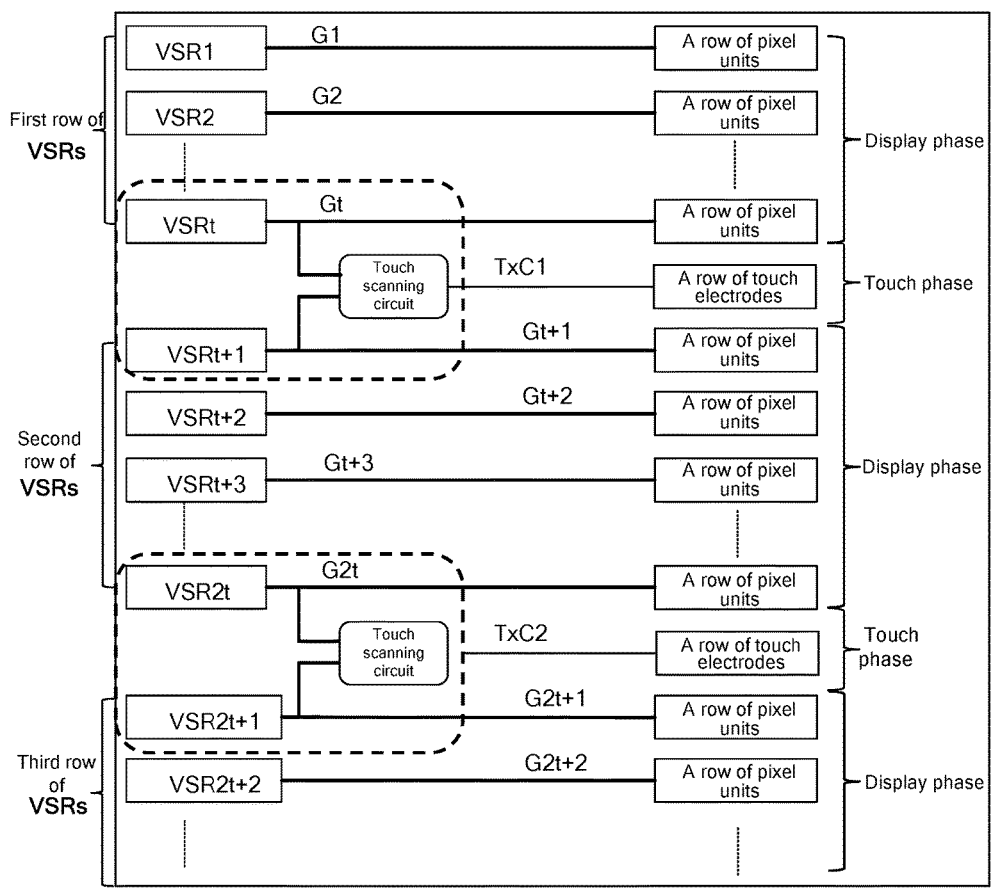
FIG. 5A is a schematic diagram showing a first correspondence relationship between shift registers and touch scanning circuits according to an embodiment of the present disclosure.

FIG. 5A is a schematic diagram showing a first correspondence relationship between shift registers and touch scanning circuits according to an embodiment of the present disclosure. As shown in FIG. 5A, the driver circuit includes a plurality of cascadedly-connected shift registers VSR respectively corresponding to the rows of pixel units on the array substrate (in such a way that each of the plurality of shift registers VSR corresponds to one row of pixel units). The plurality of cascadedly-connected shift registers VSR are divided into at least two groups, with each group of shift registers VSR being configured to drive the at least two (consecutive) rows of pixel units. The touch scanning circuits respectively correspond to the groups of shift registers VSR. Specifically, in the above case that each row of touch electrodes corresponds to at least two consecutive rows of pixel units, a touch region subjected to the touch scanning circuit 24 is consistent with (or corresponds to) a display region subjected to the corresponding groups of shift registers VSR.

Referring to FIG. 5, the driver circuit includes at least three groups of shift registers VSR. The first group of shift registers VSR includes shift registers VSR1, VSR2, and VSRt, which are configured to respectively output display scan signals G1, G2, and Gt, with each of which is used to drive a row of pixel units. The second group of shift registers VSR includes shift registers VSRt+1, VSRt+2, and VSR2t, which are configured to respectively output display scan signals Gt+1, Gt+2, and G2t, each of which is used to drive a row of pixel units. The third group of shift registers VSR includes shift registers VSR2t+1, VSR2t+2, and so on, which are configured to respectively output display scan signals G2t+1, G2t+2, and so on, each of which is used to drive a row of pixel units.

Also in the above embodiment, a first display scan signal output by a first shift register and a second display scan signal output by a second shift register can be used to drive adjacent rows of pixel units on the array substrate, respectively. That is, a touch scanning operation is performed within the interval between display scanning operations performed on the adjacent rows of pixel units. As such, the first shift register refers to the ending shift register (i.e., the last one) in the group of shift registers including the first shift register, and the second shift register refers to the initial shift register (i.e., the first one) in the group of shift registers including the second shift register, so that within an interval between display scanning operations conducted by the adjacent groups of shift registers, the touch scanning is performed by the touch scanning circuit. Specifically, referring to FIG. 5A, the first touch scanning circuit is disposed between the first group of shift registers VSR and the second group of shift registers VSR, where, the first touch scanning circuit generates, according to display scan signals from the ending shift register VSRt in the first group of shift registers and the initial shift register VSRt+1 in the second group of shift registers, a touch scan signal TXC1 for driving a row of touch electrodes. Also, the second touch scanning circuit is disposed between the second group of shift registers and the third group of shift registers, where, the second touch scanning circuit generates, according to display scan signals from the ending shift register VSR2t of the second group of shift registers and the initial shift register VSR2t+1 of the third group of shift registers, a touch scan signal TXC2 for driving a row of touch electrodes.

Here, the first, second and third groups of shift registers operate in the display period, and the touch scanning circuits operate in the touch period.

Furthermore, depending on whether the touch region controlled by the touch scanning circuit is consistent with the display region subjected to the first group of shift registers or the display region controlled by the second group of shift registers, one of two schemes provided in the embodiments of the present disclosure can be selectively used. The two schemes include: a display followed by touch scheme in which the touch region subjected to the touch scanning circuit is consistent with the display region subjected to the first group of shift registers, and a touch followed by display scheme in which the touch region subjected to the touch scanning circuit is consistent with the display region subjected to the second group of shift registers.

Figure 5B:
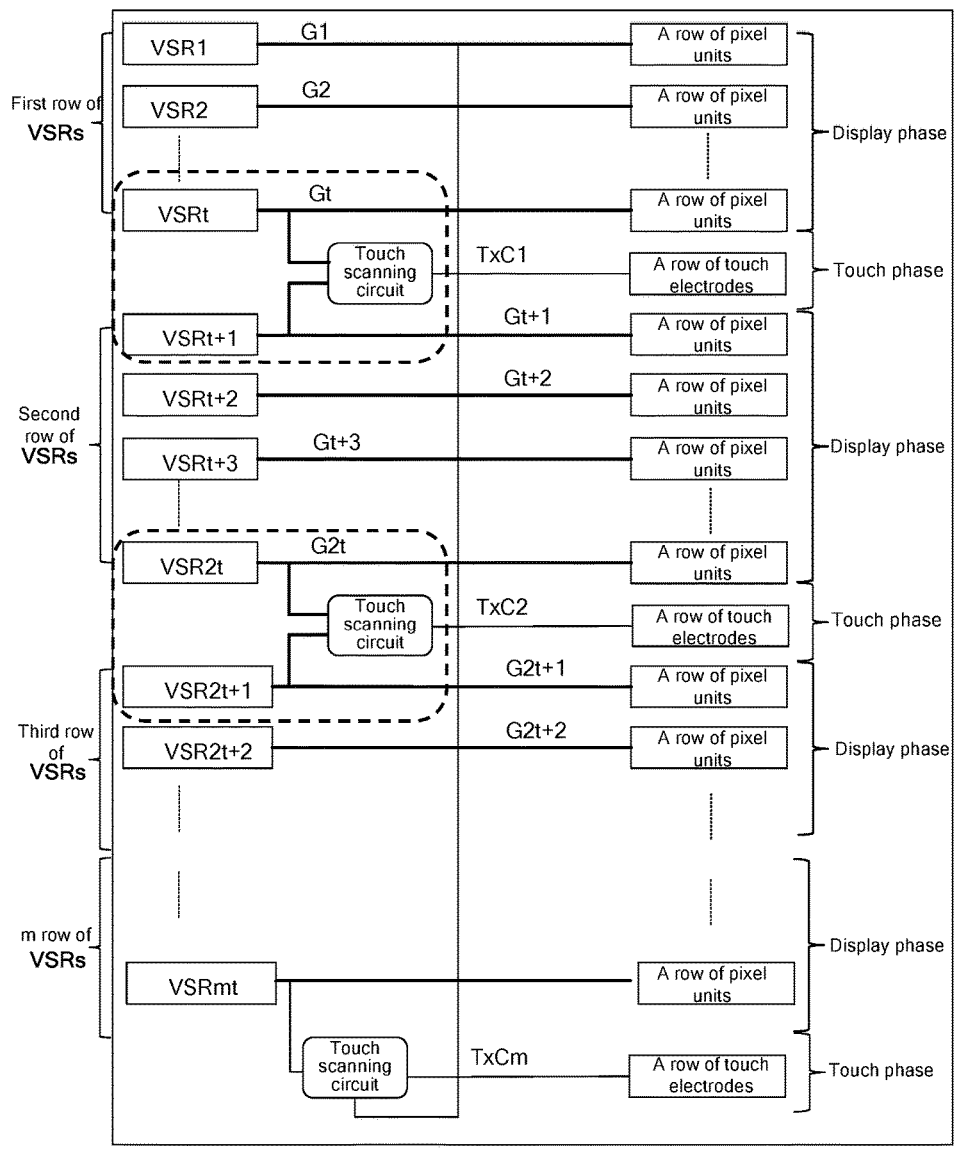
FIG. 5B is a schematic diagram showing a second correspondence relationship between shift registers and touch scanning circuits according to an embodiment of the present disclosure.

In the display followed by touch scheme, the first control terminal of the touch scanning circuit corresponding to the last group of shift registers is connected to the display scan signal outputting terminal of the ending shift register in the last group of shift registers, and the second control terminal of the touch scanning circuit corresponding to the last group of shift registers is connected to the display scan signal outputting terminal of the initial shift register in the first group of shift registers. In such configuration, after scanning for a frame of image is complete (that is, after the ending shift register of the cascadedly-connected shift registers in the driver circuit outputs the display scan signal) and before scanning for the next frame of image is started (that is, before the initial shift register of the cascadedly-connected shift registers in the driver circuit outputs the display scan signal), a touch scanning operation is performed on the last touch region on the array substrate. As shown in FIG. 5B, the last touch scanning circuit is connected to both the ending shift register in the last group (i.e. the m-th group) of shift registers and the initial shift register in the first group of shift registers. In an alternative configuration, a touch terminating signal line is provided and connected to the last touch scanning circuit, so that a termination signal may be sent to the last touch scanning circuit from the control chip through the touch terminating signal line in order to terminate the transmission of the touch signal by the last touch scanning circuit.

In the touch followed by display scheme, the first control terminal of the touch scanning circuit corresponding to the first group of shift registers is connected to a touch activating signal line and the display scan signal outputting terminal of the ending shift register in the last group of shift registers, and the second control terminal of the touch scanning circuit corresponding to the first group of shift registers is connected to the display scan signal outputting terminal of the initial shift register in the first group of shift registers. In such configuration, the touch activating signal line is additionally added in the existing driver circuit due to the absence of an activating signal for triggering the first touch scanning circuit to perform the touch scanning operation first. However, except for the first touch scanning operation, the subsequent touch scanning operations to be performed on the first touch region on the array substrate can be triggered by the display scan signal from the ending shift register in the last group of shift registers, after the display scanning operation for the last display region on the array substrate is complete. As such, in the touch followed by display scheme, there is a need to additionally provide the touch activating signal line, which may be omitted in the display followed by touch scheme. As shown in FIG. 5, the first touch scanning circuit is connected to the initial shift register in the first group of shift registers, the ending shift register in the m-th group of shift registers, and the touch activating signal line.

Figure 6:
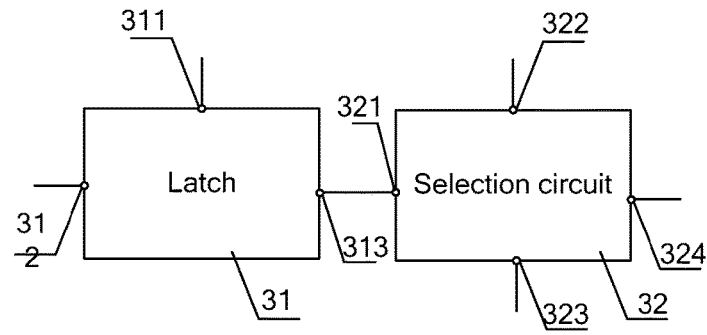
FIG. 6 is a schematic diagram showing the structure of a touch scanning circuit according to an embodiment of the present disclosure.

The specific circuit structure of the touch scanning circuit in another embodiment of the present disclosure is illustrated below. As shown in FIG. 6, the touch scanning circuit includes a latch 31 and a selection circuit 32, where the latch 31 includes a first input terminal 311, a second input terminal 312 and a first output terminal 313. The first input terminal 311 of the latch 31 corresponds to the first control terminal of the touch scanning circuit and is connected to the first display scan signal outputting terminal, and the second input terminal 312 of the latch 31 corresponds to the second control terminal of the touch scanning circuit and is connected to the second display scan signal outputting terminal. The latch 31 is configured to output a first control signal through its first output terminal 313 in the time duration from the time when the first shift register is finished outputting the first display scan signal to the time when the second shift register is started outputting the second display scan signal, and to output a second control signal through the first output terminal 313 in other time duration.

A selection control terminal 321 of the selection circuit 32 is connected to the first output terminal 313 of the latch 31, the first input terminal 322 of the selection circuit 32 is configured to receive a common voltage signal. The second input terminal 323 of the selection circuit 32 corresponds to the touch signal inputting terminal of the touch scanning circuit. The second output terminal 324 of the selection circuit 32 corresponds to the touch signal outputting terminal of the touch scanning circuit. More specifically, the selection circuit 32 is configured to, when receiving the first control signal, connect the second input terminal 323 of the selection circuit 32 with the second output terminal 324 of the selection circuit 32. That is, during the period from the time when the first shift register finishes outputting the first display scan signal to the time when the second shift register starts outputting the second display scan signal, the touch signal inputted through the second input terminal 323 is outputted to the touch electrodes from the output terminal of the selection circuit. The selection circuit 32 can be further configured to, when receiving the second control signal, connect the first input terminal 322 of the selection circuit 32 with the second output terminal 324 of the selection circuit 32. That is, in any time duration except for the time duration from the time when the first shift register is finished outputting the first display scan signal to the time when the second shift register is started outputting the second display scan signal, the common voltage signal is outputted to the touch electrodes from the output terminal of the selection circuit under the condition that the common electrode is multiplexed as the touch electrodes.

Figure 7:
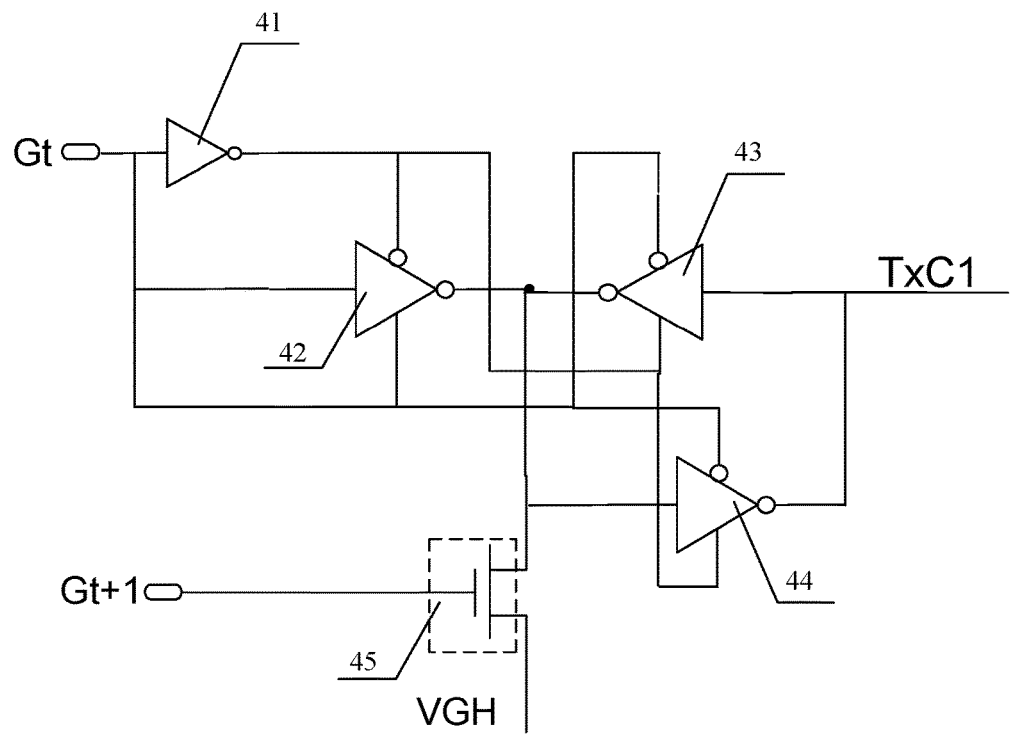
FIG. 7 is a schematic diagram showing circuitry of a latch according to an embodiment of the present disclosure.

FIG. 7 is a schematic diagram showing circuitry of a latch according to an embodiment of the present disclosure. As shown in FIG. 7, a latch 31 includes a first inverter 41, a first clock inverter 42, a second clock inverter 43, a third clock inverter 44 and a first thin film transistor 45, where an input terminal of the first inverter 41 corresponds to the first input terminal of the latch, an output terminal of the first inverter 41 is connected to a first control terminal of the first clock inverter 42, a second control terminal of the second clock inverter 43 and a second control terminal of the third clock inverter 44, both an input terminal and a second control terminal of the first clock inverter 42 is connected to the first input terminal of the latch, and an output terminal of the first clock inverter 42 is connected to an output terminal of the second clock inverter 43.

A first control terminal of the second clock inverter 43 is connected to the first input terminal of the latch, and an input terminal of the second clock inverter 43 is connected to an output terminal of the third clock inverter 44.

An input terminal of the third clock inverter 44 is connected to an output terminal of the first thin film transistor 45, a first control terminal of the third clock inverter 44 is connected to the first input terminal of the latch, and the output terminal of the third clock inverter 44 corresponds to the first output terminal of the latch.

A control terminal of the first thin film transistor 45 corresponds to the second input terminal of the latch, an input terminal of the first thin film transistor 45 is connected to a high-level signal inputting terminal VGH, and the first thin film transistor 45 may be an N-type thin film transistor which is turned on by a high-level signal. Alternatively, the input terminal of the first thin film transistor 45 is connected to a low-level signal inputting terminal VGL, and the first thin film transistor 45 may be an P-type thin film transistor which is turned on by a low-level signal.

The latch in the present embodiment is suitable for the touch scanning circuit disposed between the first group of shift registers and the second group of shift registers as shown in FIG. 5. Both the input terminals of the first inverter 41 and the first clock inverter 42 represent the first input terminal of the latch, and hence are connected to the first display scan signal outputting terminal of the ending shift register in the first group of shift registers. The input terminal of the third clock inverter 44 of the latch is connected to the output terminal of the first thin film transistor 45. A gate electrode of the first thin film transistor 45 is connected to the first display scan signal outputting terminal of the ending shift register in the first group of shift registers.

Considering that the first and second input terminals of the latch are respectively connected to two different shift registers, these two different shift registers are not allowed to simultaneously output a display scan signal, because the first input terminal and the second input terminal of the latch are not allowed to be applied with a high-level signal simultaneously. When the first shift register outputs a first display scan signal Gt and thus the first input terminal of the latch is applied with a high potential, a low-level signal is outputted from the first clock inverter 42 to pull down the potential of the input terminal of the third clock inverter 44, but both the second clock inverter 43 and the third clock inverter 44 are in an open-circuit state and hence do not output a signal. When the first display scan signal Gt is stopped and a low-level signal is inputted to the first input terminal of the latch, the second clock inverter 43 and the third clock inverter 44 are turned on, and in this case, because the input terminal of the third clock inverter 44 is set to a low level in advance, the first output terminal of the latch outputs a high-level signal. At this time, the third clock inverter 44 counteracts the second clock inverter 43, the latch is in a latched state and continuously outputs a high-level signal until a second display scan signal Gt+1 is outputted by the second shift register. That is, when the second display scan signal Gt+1 is outputted by the second shift register, the gate electrode of the first thin film transistor 45 is applied with a high-level signal, so that the first thin film transistor is turned on to receive the high-level signal from the high-level signal inputting terminal, to pull up the potential of the input terminal of the third clock inverter 44, and thus the third clock inverter 44 outputs a low-level signal. Subsequently, the second shift register stops outputting the second display scan signal Gt+1, so that the latch is in the latched state and continuously outputs the low-level signal. In the present embodiment, the high-level signal is used as the first control signal outputted by the latch, the low-level signal is used as the second control signal outputted by the latch, and the truth table for the levels outputted by the latch is as follows:

| Truth Table | Gt | G1 | TxC1 |
|---|---|---|---|
| Levels | H | H | Not Allowable |
| | H | L | X |
| | L | H | L |
| | L | L | Latched State |

Figure 8:
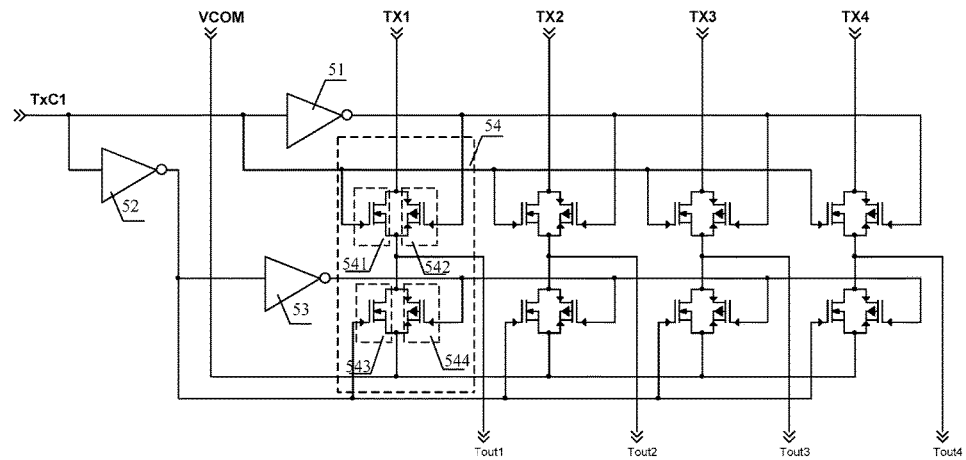
FIG. 8 is a schematic diagram showing circuitry of a selection circuit according to an embodiment of the present disclosure.

FIG. 8 is a schematic diagram showing circuitry of a selection circuit according to an embodiment of the present disclosure. As shown in FIG. 8, the selection circuit includes a second inverter 51, a third inverter 52, a fourth inverter 53, and at least one set of transmission gates 54.

An input terminal of the second inverter 51 and an input terminal of the third inverter 52 both represent the selection control terminal of the selection circuit, and an input terminal of the fourth inverter 53 is connected to an output terminal of the third inverter 52.

The set of transmission gates 54 includes a first N-channel metal oxide semiconductor (NMOS) transistor 541, a first P-channel metal oxide semiconductor (PMOS) transistor 542, a second NMOS transistor 543 and a second PMOS transistor 544. A gate electrode of the first NMOS transistor 541 is connected to the selection control terminal of the selection circuit. A gate electrode of the first PMOS transistor 542 is connected to the output terminal of the second inverter 51. A source electrode of the first NMOS transistor 541 is connected to a drain electrode of the first PMOS transistor 542 and corresponds to the second input terminal of the selection circuit. A drain electrode of the first NMOS electrode 541 is connected to a source electrode of the first PMOS transistor 542 and corresponds to the second output terminal of the selection circuit. A gate electrode of the second NMOS electrode 543 is connected to the output terminal of the third inverter 52. A gate electrode of the second PMOS electrode 544 is connected to the output terminal of the fourth inverter 53. A source electrode of the second NMOS transistor 543 is connected to a drain electrode of the second PMOS transistor 544 and corresponds to the first input terminal of the selection circuit. A drain electrode of the second NMOS transistor 543 is connected to a source electrode of the second PMOS transistor 544 and with the second output terminal of the selection circuit. In the selection circuit in the present embodiment, both the input terminals of the second inverter 51 and the third inverter 52 correspond to the selection control terminal of the selection circuit, and the input terminal of the fourth inverter is connected to the output terminal of the third inverter 52. When the selection control terminal of the selection circuit is applied with a first control signal TXC1 which is at a high level, the first NMOS transistor 541 and the first PMOS transistor 542 are turned on, so that the inputted touch signal TX from the second input terminal of the selection circuit can be outputted from the second output terminal Tout of the selection circuit to the corresponding touch electrode. When the selection control terminal of the selection circuit is applied with a second control signal TXC1 which is at a low level, the second NMOS transistor 543 and the second PMOS transistor 544 are turned on, so that the inputted common voltage signal Vcom from the first input terminal of the selection circuit can be outputted from the second output terminal Tout of the selection circuit to the corresponding touch electrode.

In the examples shown in FIG. 8, the number of the sets of transmission gates is identical to the number of touch electrodes from each row of touch electrodes. In the example shown in FIG. 8, four sets of transmission gates are provided for the case where one row of touch electrodes includes four touch electrodes. The four sets of transmission gates each are controlled by the first control signal and the second control signal to output the touch signal or the common voltage signal to the corresponding touch electrodes, respectively.

Figure 9:
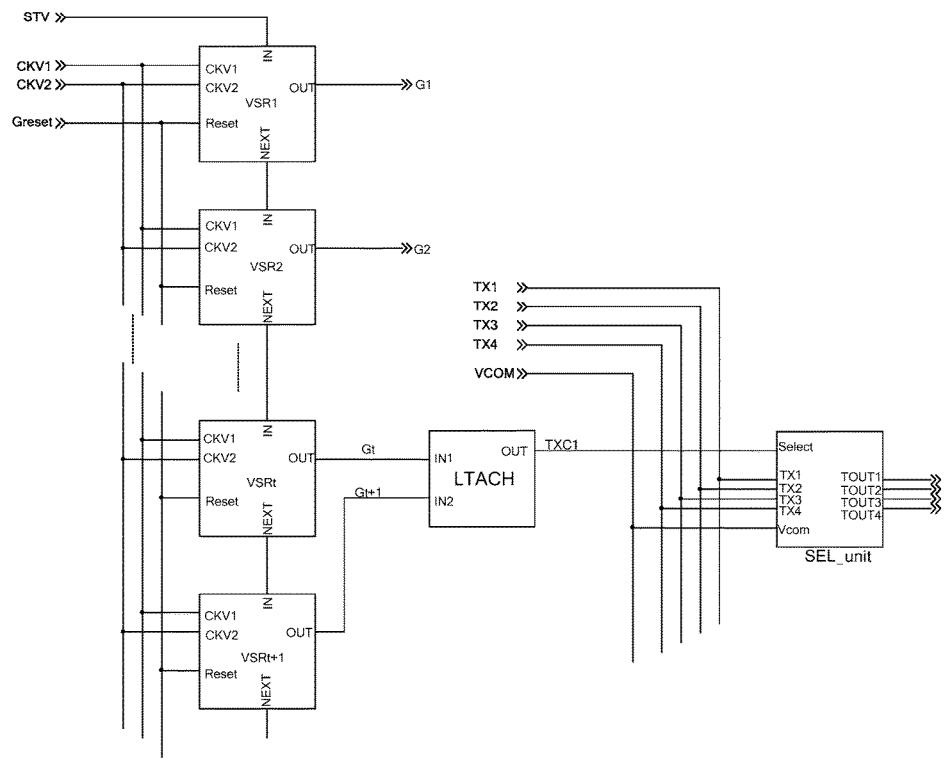
FIG. 9 is a schematic diagram showing circuitry of a portion of the driver circuits according to an embodiment of the present disclosure.

FIG. 9 is a schematic diagram showing circuitry of a portion of the driver circuit according to an embodiment of the present disclosure. FIG. 9 shows a plurality of cascadedly-connected shift registers VSR1, VSR2, VSRt, VSRt+1, and so on, and each of the shift registers includes a trigger signal inputting terminal IN. The trigger signal inputting terminal IN of the initial shift register VSR1 is connected to an STV signal, the trigger signal inputting terminal IN of each of remaining shift registers is connected to a trigger signal outputting terminal NEXT of the preceding shift register. Also, each of the shift registers is connected to two clock signal lines CLK1 and CLK2 and a reset signal line Greset, where the reset signal line Greset is connected to a reset terminal Reset of each of the shift registers. Each of the shift registers outputs a display scan signal through its scan signal outputting terminal OUT. A first input terminal IN1 of the latch LATCH is connected to the scan signal outputting terminal OUT of the shift register VSRt to receive a display scan signal Gt outputted therefrom. A second input terminal IN2 of the latch LATCH is connected to the scan signal outputting terminal OUT of the shift register VSRt+1, and an output terminal OUT of the latch LATCH is connected to the selection control terminal Select of the selection circuit SEL_unit. Besides, the selection circuit SEL_unit is also provided with four touch signal inputting terminals TX1, TX2, TX3 and TX4, one common voltage signal inputting terminal VCOM and four output terminals TOUT1, TOUT2, TOUT3 and TOUT4. When the first control signal is received by the selection control terminal of the selection terminal, the touch signal inputting terminals are respectively connected to the corresponding output terminals, so as to transmit the touch signals to the corresponding touch electrodes. However, when the second control signal is received by the selection control terminal of the selection terminal, the common voltage signal inputting terminal is connected to the corresponding output terminal, so as to transmit the common voltage signal to the corresponding touch electrode (which is embodied by the common electrode).

An embodiment of the present disclosure also provides a touch display panel, including a color filter substrate, an array substrate according to any one of the above embodiments, and a driver chip which is connected to the driver circuit on the array substrate. An embodiment of the present disclosure also provides a driving method for an array substrate.

Figure 10:
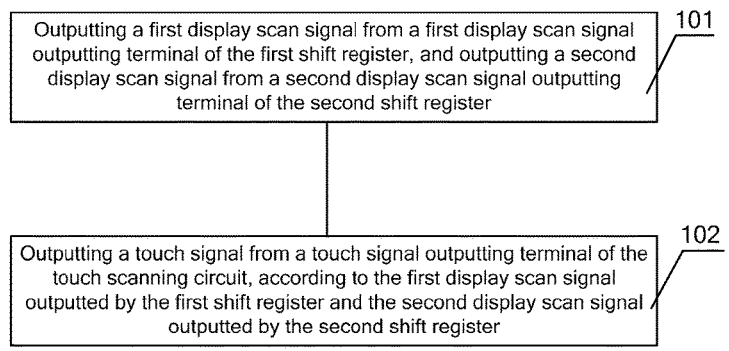
FIG. 10 is flow chart showing a driving method for an array substrate according to an embodiment of the present disclosure.

FIG. 10 is flow chart showing a driving method for an array substrate according to an embodiment of the present disclosure, where the array substrate includes a display region and a non-display region surrounding the display region, pixel units arranged in an array are provided in the display region, a driver circuit is provided in the non-display region, and the driver circuit includes a first shift register, a second shift register and a touch scanning circuit. As shown in FIG. 10, the driving method includes:

Step 101 of outputting a first display scan signal from a first display scan signal outputting terminal of the first shift register, and outputting a second display scan signal from a second display scan signal outputting terminal of the second shift register; and Step 102 of outputting a touch signal from a touch signal outputting terminal of the touch scanning circuit, according to the first display scan signal outputted by the first shift register and the second display scan signal outputted by the second shift register.

In the driving method, the display scan signals outputted by the first shift register and the second shift register for displaying are reused as a trigger signal and a termination signal for outputting of the touch signal by the touch scanning circuit. The touch scanning can thus be implemented within the interval between display scanning operations. Further, the display duration and the touch duration are explicitly separated, so that there is no interference in time sequence between the display scanning operation and the touch scanning operation. Furthermore, there is no longer a need to additionally provide a certain shift register for the touch period. In this case, the number of the circuit elements required for the non-display region of the array substrate is effectively reduced, so that the layout area required for the driver circuit in the non-display region is decreased, thereby reducing the width of the non-display region, satisfying the requirement for frame narrowing.

Figure 11A:
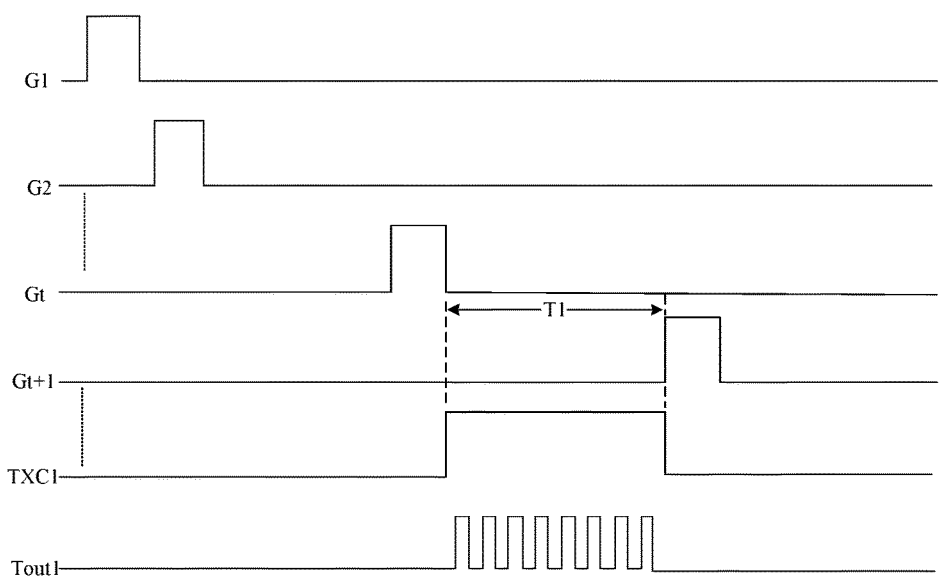
FIG. 11A is a timing diagram of a first driving method according to an embodiment of the present disclosure.

FIG. 11A is a timing diagram showing a first driving method according to an embodiment of the present disclosure. Specifically, the timing diagram of the first driving method is suitable for the driver circuit shown in FIG. 5A. The shift registers from the first group of shift registers VSR respectively output display scan signals G1, G2, ..., Gt. The ending shift register in the first group of shift registers, which is regarded as the first shift register, outputs the first display scan signal Gt, while the initial shift register in the second group of shift registers, which is regarded as the second shift register, outputs the second display scan signal Gt+1. As can be seen from FIG. 11A, after the first display scan signal Gt has been outputted by the first shift register, outputting of the second display scan signal Gt+1 by the second shift register starts after a first predetermined time duration T1, and the touch signal Tout1 is outputted by the touch signal outputting terminal of the touch scanning circuit in the first predetermined time duration T1.

Specifically, as shown in FIG. 11A, the outputting of the touch signal from the touch signal outputting terminal of the touch scanning circuit starts after the first display scan signal Gt has been received by the touch scanning circuit (i.e. at the time of a falling edge of a pulse of the first display scan signal Gt), and ends after the second display scan signal Gt+1 has been received by the touch scanning circuit (i.e. at the time of a rising edge of a pulse of the second display scan signal Gt+1). The touch signal in the present embodiment is a touch detecting pulse signal.

Further, in the above embodiment of the present disclosure, the touch scanning circuit includes a latch and a selection circuit. The latch is configured to output a first control signal through its output terminal in the time duration from the time when the first shift register is finished outputting the first display scan signal to the time when the second shift register is started outputting the second display scan signal, and to output a second control signal through the output terminal in other time duration. Still referring to FIG. 11A, a signal TXC1 is outputted by the latch, where the first control signal is indicated by a high-level signal and the second control signal is indicated by a low-level signal.

The selection circuit selectively outputs different signals depending on whether the first control signal or the second control signal is received. When the first control signal (i.e. the high-level signal) is received, the touch signal Tout1 is outputted from the output terminal of the selection circuit, and when the second control signal (i.e. the low-level signal) is received, the common voltage signal Vcom is outputted from the output terminal of the selection circuit.

Further, in the embodiment of the present disclosure, the driver circuit includes a plurality of cascadedly-connected shift registers VSR respectively corresponding to the rows of pixel units on the array substrate (in such a way that each of the plurality of shift registers VSR corresponds to one row of pixel units). The plurality of cascade-connected shift registers VSR are divided into at least two groups, with each group of shift registers VSR being configured to drive the at least two (consecutive) rows of pixel units. The touch scanning circuits respectively correspond to the groups of shift registers VSR.

Figure 11B:
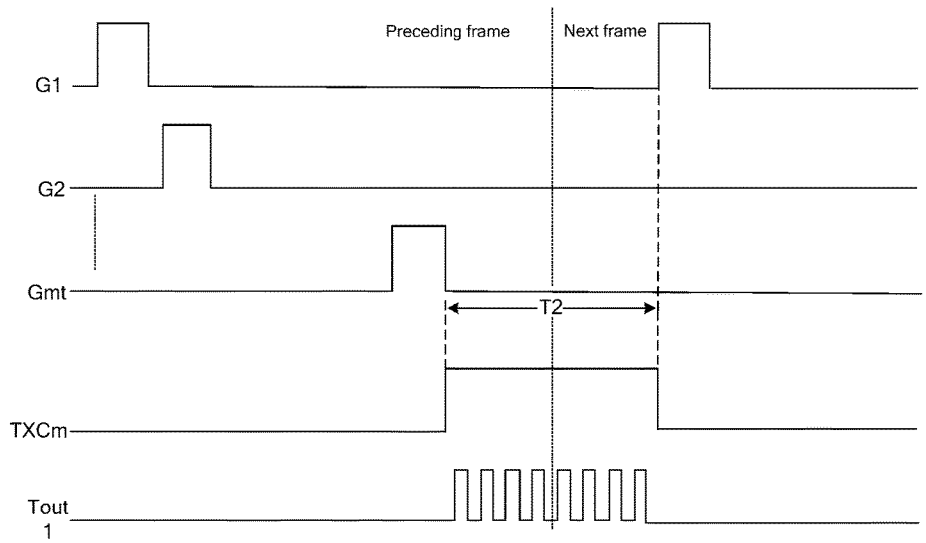
FIG. 11B is a timing diagram of a second driving method according to an embodiment of the present disclosure.

Referring to FIG. 5B in the above embodiment, which shows the display followed by touch scheme applied to an area on the array substrate, the touch scanning circuit corresponding to the last group of shift registers is also connected to the initial shift register in the first group of shift registers. As shown in FIG. 11B, the touch scanning circuit is configured to start outputting the touch signal Tout1 after receiving the display scan signal from the ending shift register in the last group of shift registers, and to stop outputting the touch signal Tout1 after receiving the display scan signal from the initial shift register in the first group of shift registers. That is, the touch signal Tout1 is outputted for the corresponding time duration T2. In other time durations, the common voltage signal is outputted. The touch signal in the present embodiment is a touch detecting pulse signal.

Figure 5C:
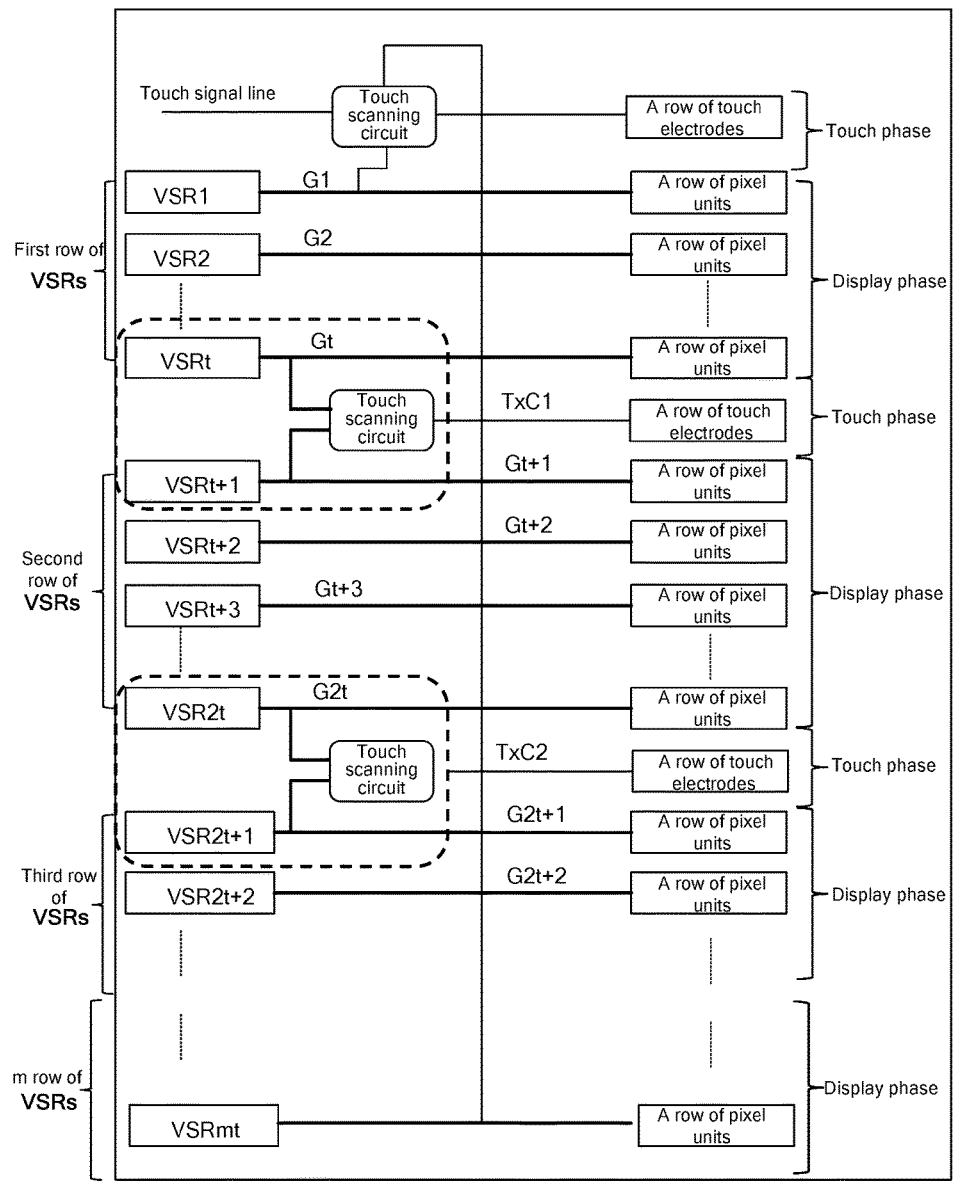
FIG. 5C is a schematic diagram showing a third correspondence relationship between shift registers and touch scanning circuits according to an embodiment of the present disclosure.
Figure 11C:
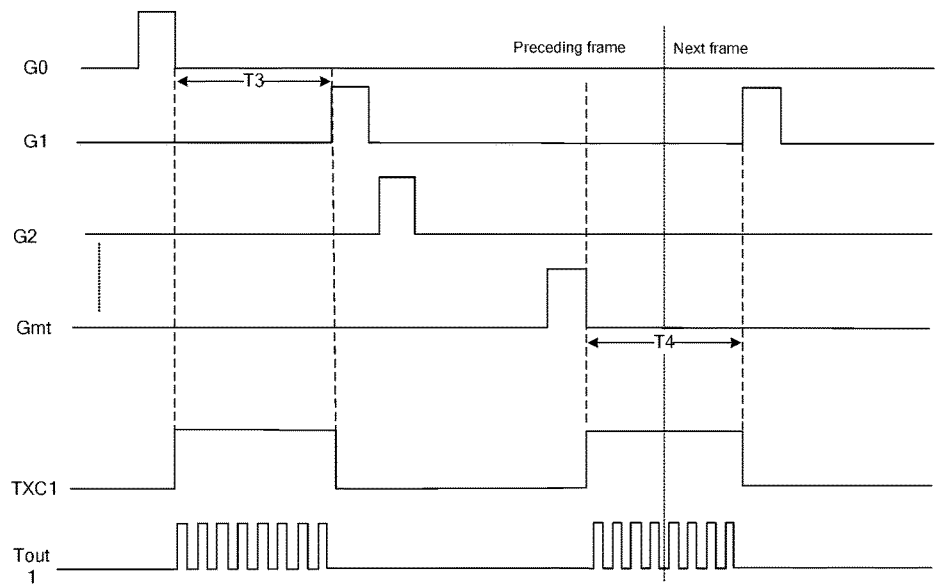
FIG. 11C is a timing diagram of a third driving method according to an embodiment of the present disclosure.

Also, referring to FIG. 5C in the above embodiment, which shows the touch followed by display scheme applied to an area on the array substrate, the touch scanning circuit corresponding to the first group of shift registers is connected to both the touch activating signal line and the ending shift register in the last group of shift registers. As shown in FIG. 11C, in the first touch period, the touch scanning circuit is configured to start outputting the touch signal Tout1 after receiving the touch activating signal G0 from the touch activating signal line, and to stop outputting the touch signal Tout1 after receiving the display scan signal G1 from the initial shift register in the first group of shift registers. That is, the touch signal Tout1 is outputted for the corresponding time duration T3. In other touch period except for the first touch period, the touch scanning circuit is configured to start outputting the touch signal Tout1 after receiving the display scan signal Gmt from the ending shift register in the last group of shift registers, and to stop outputting the touch signal Tout1 after receiving the display scan signal G1 from the initial shift register in the first group of shift registers. That is, the touch signal Tout1 is outputted for the corresponding time duration T4. In other time durations, the common voltage signal is outputted. The touch signal in the present embodiment is a touch detecting pulse signal.

With the technical solutions provided by the embodiments of the present disclosure, the display scan signals outputted by the two shift registers are respectively utilized as a trigger signal and a termination signal to be used in outputting a touch signal by the touch scanning circuit, thereby reusing the shift registers already existing in the driver circuit during a touch period and a display period, and implementing the touch scanning within the interval between display scanning operations; further, the display duration and the touch duration are explicitly separated, so that no interference in time sequence is present between the display scanning operation and the touch scanning operation. With the technical solution, there is no longer a need to additionally provide a certain shift register for the touch period. In this case, the number of the circuit elements required for the non-display region of the array substrate is effectively reduced, so that the layout area required for the driver circuit in the non-display region is decreased, thereby reducing the width of the non-display region, satisfying the requirement for frame narrowing. Besides, the number of the scan lines required for achievement of the touch function by the driving chip can be reduced, and the number of I/O ports in the driving chip can also be reduced.

It is noted that the embodiments and the applied technology principles of the present disclosure are merely described as above. It should be understood for those skilled in the art that the present disclosure is not limited to particular embodiments described herein. Various apparent changes, readjustment and substitution can be made by those skilled in the art without departing the scope of protection of the present disclosure. Therefore, although the present disclosure is illustrated in detail through the above embodiments, the present disclosure is not merely limited to the above embodiments, and can further include more of other equivalent embodiments without departing the conception of the present disclosure. The scope of the present disclosure is subject to the appended claims.

The invention claimed is:

1. An array substrate, comprising: a display region; a non-display region surrounding the display region; pixel units arranged as an array in the display region; and a driver circuit disposed in the non-display region, wherein the driver circuit comprises:
 a first shift register and a second shift register, wherein the first shift register comprises a first display scan signal outputting terminal for outputting a first display scan signal, and the second shift register comprises a second display scan signal outputting terminal for outputting a second display scan signal; and a touch scanning circuit having a first control terminal and a second control terminal, the first control terminal being connected to the first display scan signal outputting terminal, the second control terminal being connected to the second display scan signal outputting terminal, wherein the touch scanning circuit further comprises a touch signal inputting terminal and a touch signal outputting terminal such that in a touch period, the touch scanning circuit is configured to output a touch signal through the touch signal outputting terminal according to the first display scan signal and the second display scan signal, wherein the touch scanning circuit comprises a latch, wherein a first input terminal of the latch is connected to the first display scan signal outputting terminal, and a second input terminal of the latch is connected to the second display scan signal outputting terminal, and wherein the latch is configured to output a first control signal through an output terminal of the latch within a time duration from a time when the first shift register is finished outputting the first display scan signal to a time when the second shift register is started outputting the second display scan signal, and to output a second control signal through the output terminal of the latch in other time duration.

2. The array substrate of claim 1, wherein, the first display scan signal and the second display scan signal are configured to respectively drive adjacent rows of pixel units on the array substrate.

3. The array substrate of claim 1, wherein the first shift register, the second shift register and the touch scanning circuit are disposed in the non-display region on one side of the array substrate.

4. The array substrate of claim 1, wherein the first shift register and the touch scanning circuit are disposed in the non-display region on a first side of the array substrate while the second shift register is disposed in the non-display region on a second side of the array substrate, or, the first shift register is disposed in the non-display region on the first side of the array substrate while the second shift register and the touch scanning circuit are disposed in the non-display region on the second side of the array substrate.

5. The array substrate of claim 4, wherein the second control terminal of the touch scanning circuit is connected to the second display scan signal outputting terminal of the second shift register located in the non-display region on the second side of the array substrate through a first wire running through the display region of the array substrate; or, the first control terminal of the touch scanning circuit is connected to the first display scan signal outputting terminal of the first shift register located in the non-display region on the first side of the array substrate through a second wire running through the display region of the array substrate.

6. The array substrate of claim 1, comprising at least two touch scanning circuits, which are disposed in at least one of: the non-display region on the first side of the array substrate and the non-display region on the second side of the array substrate.

7. The array substrate of claim 1, wherein a common electrode in the display region of the array substrate is divided into touch electrodes arranged in a matrix, each of the touch electrodes is assigned with a corresponding touch wire, and the touch electrodes from each row of touch electrodes are all connected to the touch signal outputting terminal of the same touch scanning circuit via the corresponding touch wire.

8. The array substrate of claim 1, wherein each row of the touch electrodes on the array substrate correspond to at least two consecutive rows of pixel units.

9. The array substrate of claim 8, wherein the driver circuit comprises a plurality of shift registers respectively corresponding to the rows of pixel units, the plurality of shift registers being divided into at least two groups, each group of the shift registers being configured to drive at least two consecutive rows of pixel units, and the touch scanning circuits respectively correspond to the at least two groups of shift registers;

the first control terminal of the touch scanning circuit corresponding to the last group of shift registers is connected to the display scan signal outputting terminal of the ending shift register in the last group of shift registers, and the second control terminal of the touch scanning circuit corresponding to the last group of shift registers is connected to the display scan signal outputting terminal of the initial shift register in the first group of shift registers.

10. The array substrate of claim 8, wherein the driver circuit comprises a plurality of shift registers respectively corresponding to the rows of pixel units, the plurality of shift registers being divided into at least two groups, each group of the shift registers being configured to drive at least two consecutive rows of pixel units, and the touch scanning circuits respectively correspond to the at least two groups of shift registers;

the first control terminal of the touch scanning circuit corresponding to the first group of shift registers is connected to the touch activating signal line or is connected to the display scan signal outputting terminal of the ending shift register in the last group of shift registers, and the second control terminal of the touch scanning circuit corresponding to the first group of shift registers is connected to the display scan signal outputting terminal of the initial shift register in the first group of shift registers.

11. The array substrate of claim 1, wherein the touch scanning circuit further includes a selection circuit, wherein a selection control terminal of the selection circuit is connected to the output terminal of the latch, a first input terminal of the selection circuit is configured to receive a common voltage signal, a second input terminal of the selection circuit corresponds to the touch signal inputting terminal of the touch scanning circuit, and an output terminal of the selection circuit corresponds to the touch signal outputting terminal of the touch scanning circuit, and wherein the selection circuit is configured to connect the second input terminal of the selection circuit with the output terminal of the selection circuit when receiving the first control signal, and to connect the first input terminal of the selection circuit with the output terminal of the selection circuit when receiving the second control signal.

12. The array substrate of claim 11, wherein the selection circuit comprises a second inverter, a third inverter, a fourth inverter, and at least one set of transmission gates;

input terminals of the second and third inverters both correspond to the selection control terminal of the selection circuit, and an input terminal of the fourth inverter is connected to an output terminal of the third inverter;

the set of transmission gates comprise a first N-type metal-oxide-semiconductor (NMOS) transistor, a first P-type metal-oxide-semiconductor (PMOS) transistor, a second NMOS transistor and a second PMOS transistor, wherein a gate electrode of the first NMOS transistor is connected to the selection control terminal of the selection circuit, a gate electrode of the first PMOS transistor is connected to the output terminal of the fourth inverter, a source electrode of the first NMOS transistor is connected to a drain electrode of the first PMOS transistor and corresponds to the second input terminal of the selection circuit, a drain electrode of the first NMOS electrode is connected to a source electrode of the first PMOS transistor and corresponds to the output terminal of the selection circuit, a gate electrode of the second NMOS electrode is connected to the output terminal of the third inverter, a gate electrode of the second PMOS electrode is connected to the output terminal of the fourth inverter, a source electrode of the second NMOS transistor is connected to a drain electrode of the second PMOS transistor and corresponds to the first input terminal of the selection circuit, and a drain electrode of the second NMOS transistor is connected to a source electrode of the second PMOS transistor and with the output terminal of the selection circuit.

13. The array substrate of claim 1, wherein the latch comprises a first inverter, a first clock inverter, a second clock inverter, a third clock inverter and a first thin film transistor, wherein an input terminal of the first inverter corresponds to the first input terminal of the latch, an output terminal of the first inverter is connected to a first control terminal of the first clock inverter, a second control terminal of the second clock inverter and a second control terminal of the third clock inverter;

both an input terminal and a second control terminal of the first clock inverter are connected to the first input terminal of the latch, and an output terminal of the first clock inverter is connected to an output terminal of the second clock inverter;

a first control terminal of the second clock inverter is connected to the first input terminal of the latch, and an input terminal of the second clock inverter is connected to an output terminal of the third clock inverter;

an input terminal of the third clock inverter is connected to an output terminal of the first thin film transistor, a first control terminal of the third clock inverter is connected to the first input terminal of the latch, and the output terminal of the third clock inverter corresponds to the output terminal of the latch;

a control terminal of the first thin film transistor is connected to the second input terminal of the latch, and an input terminal of the first thin film transistor is connected to a control terminal.

14. A touch display panel, comprising a color filter substrate, the array substrate according to claim 1, and a driver chip which is connected to the driver circuit on the array substrate.

* * * * *